No. 662,580. Patented Nov. 27, 1900.
C. VICARINO.
APPARATUS FOR ELECTRICALLY LIGHTING RAILWAY CARRIAGES, &c.
(Application filed Apr. 24, 1900.)
(No Model.) 4 Sheets—Sheet 1.

WITNESSES: INVENTOR:
Charles Vicarino,
By his Attorneys:

No. 662,580. Patented Nov. 27, 1900.
C. VICARINO.
APPARATUS FOR ELECTRICALLY LIGHTING RAILWAY CARRIAGES, &c.
(Application filed Apr. 24, 1900.)
(No Model.) 4 Sheets—Sheet 2.

WITNESSES:
Fred White
Thomas F. Wallace

INVENTOR:
Charles Vicarino,
By his Attorneys:
Arthur C. Fraser & Co.

No. 662,580. Patented Nov. 27, 1900.
C. VICARINO.
APPARATUS FOR ELECTRICALLY LIGHTING RAILWAY CARRIAGES, &c.
(Application filed Apr. 24, 1900.)
(No Model.) 4 Sheets—Sheet 3.
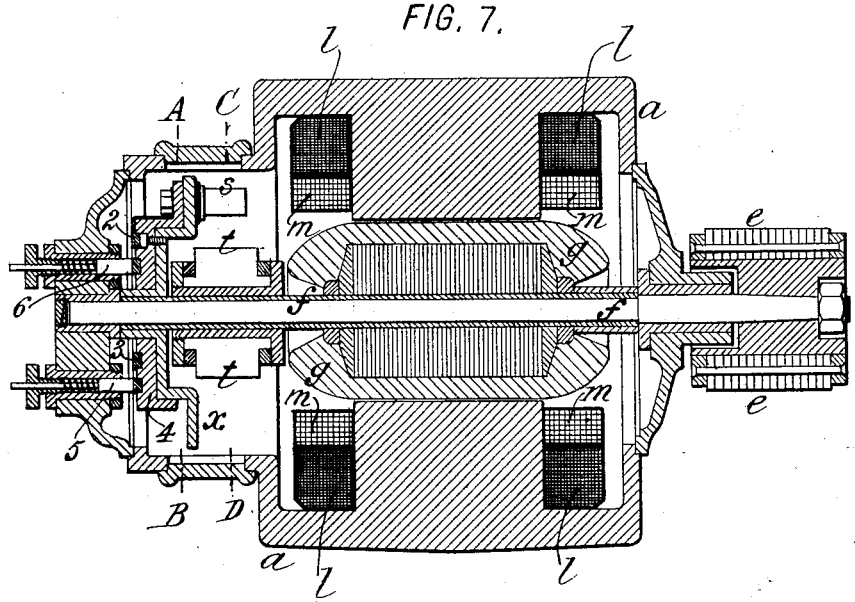
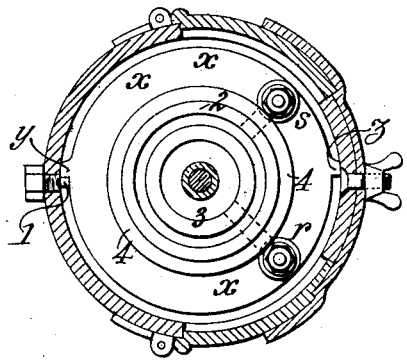 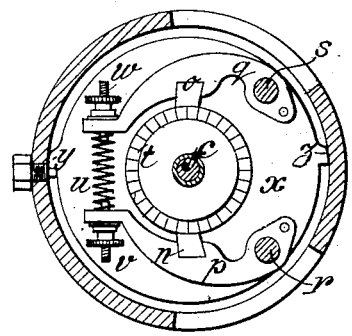
WITNESSES: INVENTOR:
Fred White Charles Vicarino,
Thomas J. Wallace By his Attorneys No. 662,580.  
C. VICARINO.  
Patented Nov. 27, 1900.

APPARATUS FOR ELECTRICALLY LIGHTING RAILWAY CARRIAGES, &c.

(Application filed Apr. 24, 1900.)

(No Model.)  
4 Sheets—Sheet 4.

WITNESSES:  
Fred White  
Thomas J. Wallace

INVENTOR:  
Charles Vicarino,  
By his Attorneys  
Arthur C. Fraser & Co

THE NORRIS PETERS CO., PHOTO-LITHO., WASHINGTON, D. C.

UNITED STATES PATENT OFFICE.

CHARLES VICARINO, OF NANCY, FRANCE.

APPARATUS FOR ELECTRICALLY LIGHTING RAILWAY-CARRIAGES, &c.

SPECIFICATION forming part of Letters Patent No. 662,580, dated November 27, 1900.

Application filed April 24, 1900. Serial No. 14,105. (No model.)

*To all whom it may concern:*

Be it known that I, CHARLES VICARINO, engineer, a citizen of the Republic of Switzerland, residing in Nancy, Meurthe-et-Moselle, France, have invented new and useful Improvements in Apparatus for Electrically Lighting Railway-Carriages or other Vehicles, which invention is fully set forth in the following specification.

The object of this invention is to provide an improved device for electrically lighting railway-carriages and other vehicles; and the invention consists, essentially, of an automatic pole-changer combined with a dynamo, a battery of accumulators fixed to the underframe of the vehicle, and an automatic switch disposed between the dynamo and the accumulators.

Figure 1:
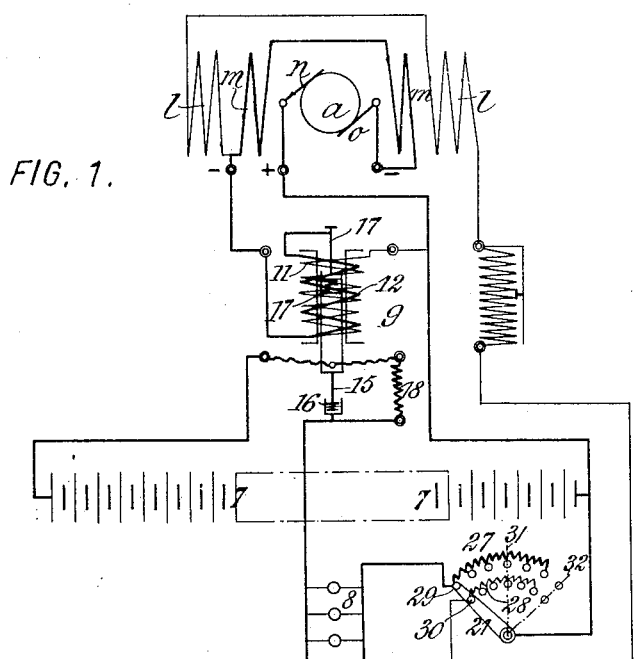
Figure 2:
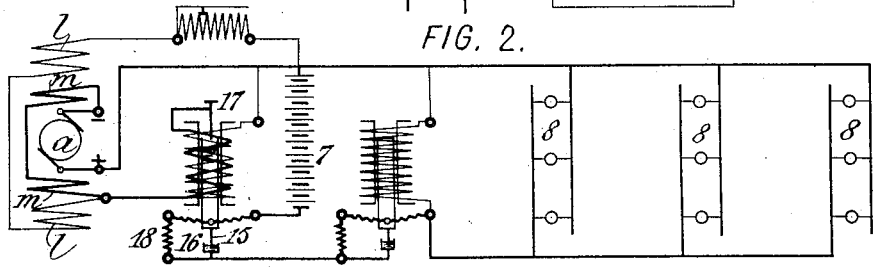
Figure 3:
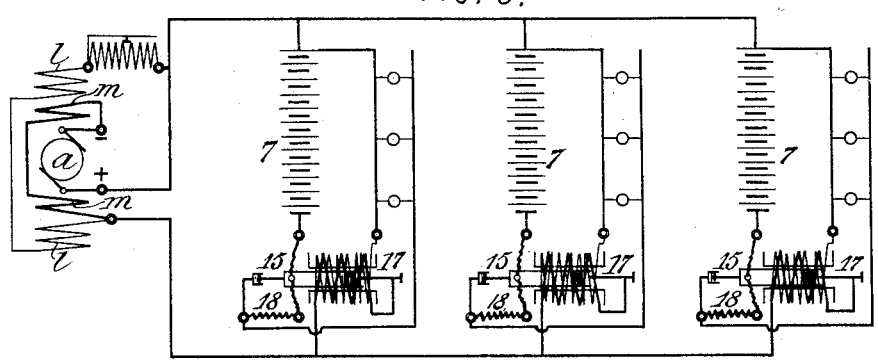
Figure 4:
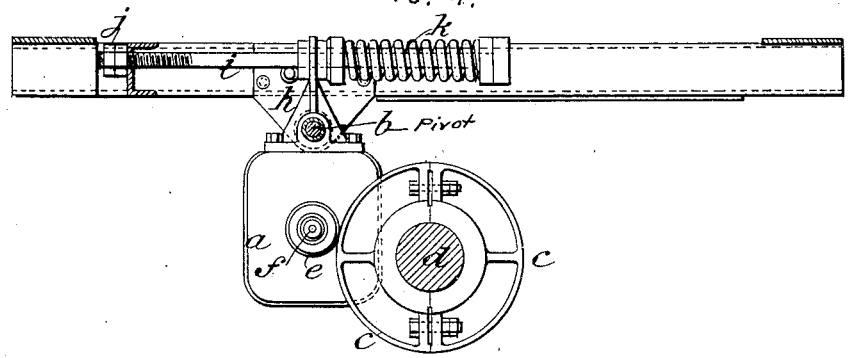
Figure 5:
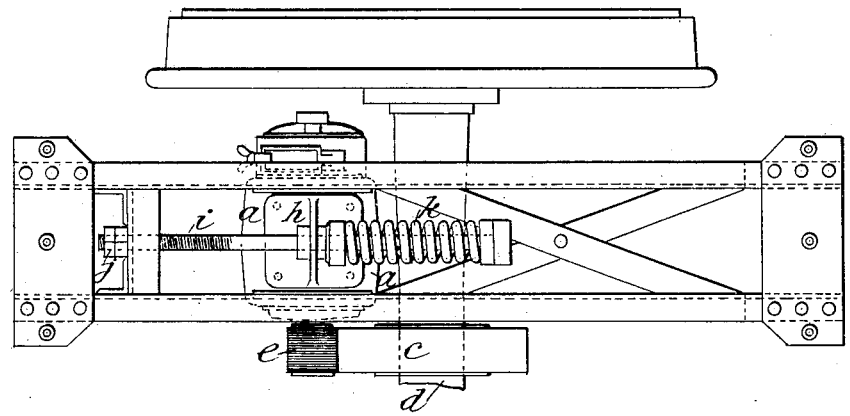
Figure 6:
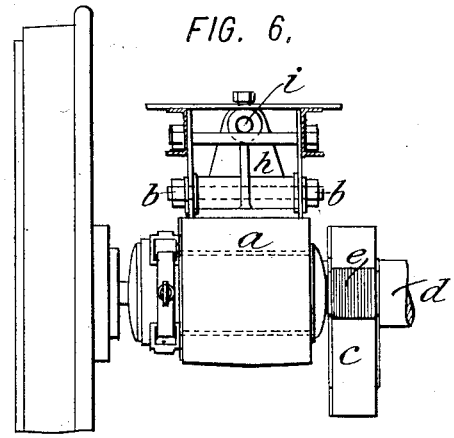
Figure 10:
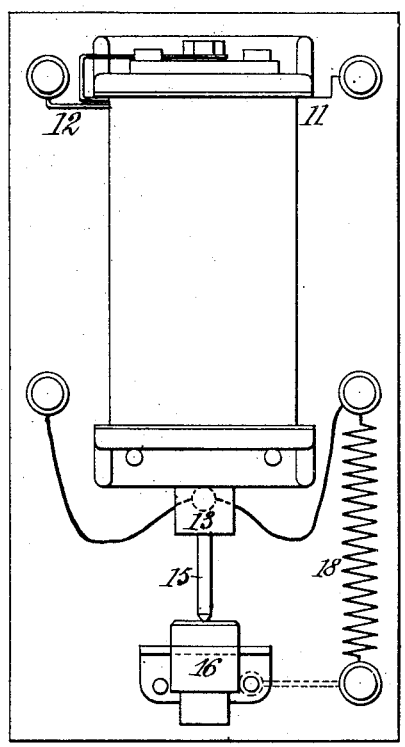
Figure 11:
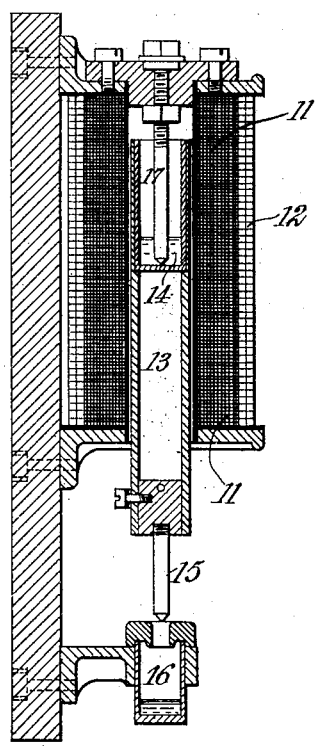
Figure 12:
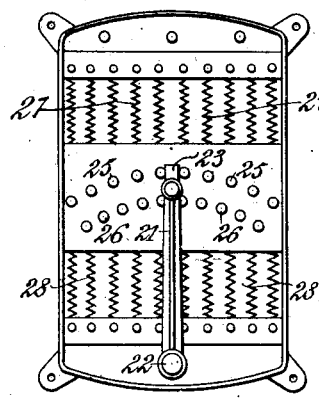
Figure 13:
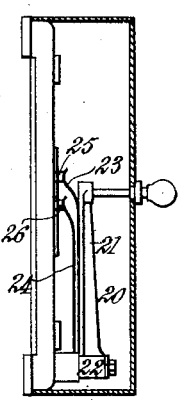
Figure 14:
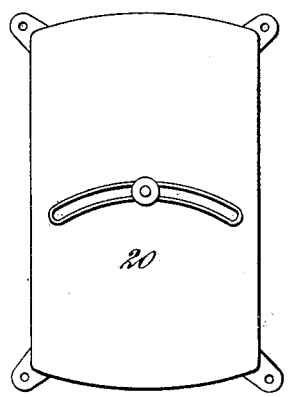

Referring to the accompanying drawings, Figure 1 is a diagrammatic view of the general arrangement of the apparatus. Figs. 2 and 3 are modified diagrams of the same, one being shown with a single battery of accumulators and the other having a battery for every carriage. Figs. 4, 5, and 6 represent a lateral elevation, a plan, and an end elevation of the dynamo, respectively, the latter showing its mode of suspension. Fig. 7 is a longitudinal section of the dynamo; and Figs. 8 and 9 are sections taken on A B and C D, respectively, of Fig. 7. Figs. 10 and 11 are a face view and a vertical section of the switch, and Figs. 12, 13, and 14 show an internal section and a front elevation of a rheostat disposed for acting at one and the same time upon the circuit of the lamps and upon the secondary winding of the dynamo.

The dynamo $a$, provided with a suitable casing, is fixed, by means of a suspended articulated joint $b$, to the underframe of the carriage or other vehicle and is driven by elastic friction by means of a pulley $c$, formed in two parts and keyed upon the axle $d$ of the vehicle, such pulley being adapted to act against a friction-wheel $e$ or the like, of leather or other suitable material, fast upon the shaft $f$ of the armature $g$; but it is obvious that the desired power may be transmitted by belt, gearing, or the like.

The rocking frame $h$, which carries the dynamo and which is fulcrumed at $b$, is traversed by a screw-threaded rod $i$, around one end of which is wound a spring $k$, controlled by suitable nuts, the tension of which spring, while variable at will, determines the friction of the pinion $e$ upon the pulley $c$.

The field-magnets are furnished with two windings, one of which is of fine wire $l$ for the shunt-circuit from the armature, while the other is of thick wire $m$ for the main circuit. The former excites the dynamo and generates the current, while the latter demagnetizes the field-magnets. The differential action of the two windings is combined in such a manner as to practically maintain the tension of the dynamo constant for the various speeds.

In order that the dynamo may revolve in the one or other direction while yet producing a current in the outer circuit having a uniform direction, the carbon brushes $n$ $o$ thereof are fixed to the brush-holders $p$ $q$, which latter are mounted loose on their gudgeons $r$ $s$ and are held in contact with the collector $t$ by means of a single insulated spring $u$, adapted to be adjusted by suitable screw-nuts $v$ $w$. These brushes and brush-holders are fixed to a bronze disk $x$, mounted loose on the shaft $f$ of the dynamo in such a manner as to be moved in the direction of rotation imparted to the armature by the friction of the brushes upon the collector and by the disk upon the shaft. The stroke of the said disk is limited to one hundred and eighty degrees by suitable stops $y$ $z$ and tappets 1, so that the brushes are displaced for half a circle when the direction of rotation is reversed and then remain in such position while the same direction of movement is continued. The gudgeons $r$ $s$ of the brush-holders are each connected to copper rings 2 3, fixed upon a plate 4, of insulating material, made fast upon the before-mentioned bronze disk $x$, which serves as current-conductor. Hence it will be seen that whether the dynamo revolves in one direction or the other the current transmitted to the external circuit flows always in a uniform direction. This current serves to feed the lamps and to charge a battery of accumulators. To this end one pole of the dynamo is connected with the accumulators 7 and lamps 8 and to the other apparatus in connection therewith, while the other pole is connected with the thick wire of the field-magnets and with an automatic switch 9. This switch (shown more clearly in Figs. 10 and 11) consists of a vertically-disposed double-wound solenoid having one of its wires—the thin wire—connected with the terminals of the armature, while the other wire—the thick wire—is traversed by the main circuit. This solenoid is furnished with a soft-iron core 13 of tubular form, which at its upper end terminates in a cup or saucer 14, filled with mercury, while to the lower end of the core is secured a rod 15, adapted to dip into a similar cup of mercury 16. A metal rod 17, fixed to the upper part of the coil, dips into the cup at the upper end of the core 14 when this latter is drawn in by the action of the solenoid. The current from the dynamo flows through the coarse wire 12 of the switch, the metal rod 17, cup 14, and core 13 and divides into two circuits, the one passing direct to the accumulators 7 and the other flowing through the resistance 18 and feeding the lamps. At this moment the two windings act in the same direction, the action of the coarse wire being added to that of the fine wire. If, on the contrary, the dynamo is stopped or if it gives a current of lower tension than the accumulators, the core 13 descends by its own weight, the rod 17 is no longer in contact with the mercury of the cup 14, and another suitably-arranged rod 15 in opposition dips into the cup 16. The dynamo is then no longer in communication with the accumulators, and these latter feed the lamps, and the resistance 18 is placed in short circuit.

A commutator 26 serves for the lighting of the lamps, for extinguishing, and for turning low the lamps by introducing a resistance into the circuit, as may be required. It also serves to establish or to interrupt the shunt-current in the fine wire of the dynamo and to interpolate a field-resistance for absorbing the tension of the dynamo when reducing the light-giving intensity. This commutator comprises a handle 21, adapted to turn on a center 22, and formed with two elastic contacts 23 24, which move over two series of circular contacts 25 and 26, corresponding to the resistances 27 and 28, one of which is connected to the circuit of the lamps, the other being placed in the shunt-circuit, as shown in Fig. 1. In the position occupied by the apparatus where the lamps are lighted the current feeding the latter passes from the common pole of the dynamo through the handle 21 and contact 29 direct to the lamps, while the shunt-current is established through the same handle 21 and its contact 30. In the position occupied when it is desired to turn the lamps low the current passes from the handle 21 of the commutator through the resistances 27 into the lamps, thus lowering the tension. At the same time the current passes from the said handle 21 through the other resistances 28 to the convolutions of the secondary winding of the field-magnets and reduces their excitation. The intensity of the light and simultaneously therewith the excitation may be varied to any desired degree by shifting the handle upon the resistance-contacts. In the position occupied when the lamps are extinguished the two circuits of the lamps and the excitation of the dynamo are interrupted.

The dynamo revolves at a speed absolutely variable, and exciting the action of the automatic pole-changer places the brushes with regard to the collector in such a position that the direction of the current produced remains invariable. While the dynamo is at rest and while it supplies a lower tension than that from the accumulators, these latter only feed the lamps. Directly the tension of the dynamo becomes superior to that of the accumulators the core 13 is drawn inward by the action of the solenoid of the interrupter. The current of the dynamo passes through the coarse wire $m$ of the field-magnets, demagnetizing the dynamo and maintaining its tension in equilibrium, passes through the coarse wire 12 of the interrupter, and increases its attraction upon the core 13, and feeds on the one hand the accumulators 7 direct and on the other hand the lamps 8, passing through the resistance 18. This resistance interpolated in the circuit of the lamps slightly reduces the tension and produces an alteration of the tension, which has for effect the charging of the accumulators. If the speed of the dynamo is accelerated, its tension has a tendency to increase, and the intensity of the current in the accumulators increases and demagnetizes the dynamo. As, however, the resistance of the accumulators is very weak compared with that of the lamps, the accumulators will be charged while the tension of the lamps remains practically constant. From this it will be seen that according to the speed imparted to the dynamo the current for charging the accumulators varies, while the tension of the lamps and their intensity remains constant.

I have shown in Fig. 2 the application of my improved system to the lighting of a whole train by means of a single dynamo and a single battery of accumulators placed in a special van, and in Fig. 3 the arrangement as applied to the lighting of a train by means of a single dynamo driven from one of the axles and charging the batteries of accumulators individual to each carriage. The general arrangements are the same as that hereinbefore described.

Having now particularly described and ascertained the nature of my said invention and in what manner the same is to be performed, I declare that what I claim is—

1. The automatic pole-changer, consisting of a disk, brushes carried by said disk and adapted to rest on the collector, the said disk being placed in its proper position by the movement of the armature-shaft according to the direction of rotation of this latter, a fixed stop for retaining said disk in its proper position, an insulated ring carrying said brushes, and a spring-contact bearing on said ring for taking off the current, substantially as described and illustrated by the accompanying drawings.

2. The combination with a dynamo and a series of lamps in circuit therewith, of a double rheostat comprising means adapted to produce the lighting, the lowering, and the extinction of the lamps, means for acting upon the excitation of the dynamo, and a lever adapted to operate both said means simultaneously, substantially as described.

3. The combination with a dynamo, of an accumulator 7, a group of lamps 8, means for closing a circuit through said accumulator and lamps, means for throwing said accumulator and lamps into connection with said dynamo and in multiple arc with each other, and a resistance 18 adapted to be inserted in the branch carrying the lamps.

4. The combination in a system for lighting railway-cars of a storage battery, a working circuit containing lamps and a dynamo of described closed construction pivoted to the frame of the car and suspended therefrom by a spring and rotated from the car-axle by a friction-pulley, as described, said dynamo being provided with two field-magnet windings, one in a shunt to the armature-terminals and exciting the dynamo and the second in the main circuit containing the storage battery and lamps and wound in opposite direction to the first with the object to equalize the output of the dynamo on the raising of the speed of rotation of the armature.

5. The combination in a car-lighting system of a storage battery, a lamp-circuit, a dynamo with reverse compound field-magnet winding worked from the car-axle by friction-pulley, of an automatic pole-changer so as to enable said dynamo to furnish current of constant direction upon reversal of motion of the cars, said pole-changer consisting of a brush-holder-supporting ring carrying two brush-holders pivoted on axles and connected by a single insulated spiral spring as described, the whole mounted loosely with a ball-bearing on an independent sleeve without any frictional contact on the axle of the dynamo, so as to be rotated through an arc of one hundred and eighty degrees by friction of the carbon brushes on change of the direction of rotation of the armature, said arc being limited by two stops; the current being transmitted to the external circuit from two concentric contact-rings connected to the brushes and two elastic contact-brushes fixed on the frame of the dynamo and connected to the pole-terminals.

6. The combination in a car-lighting system of a storage battery, a lamp-circuit, a dynamo driven by the car-axle and provided with reverse compound field-magnet winding, an automatic pole-changer of described construction and an automatic switch consisting of a vertical solenoid provided with two windings, one in shunt to the pole-terminals of the dynamo, the second in the main circuit containing the battery and lamps, said solenoid having a cylindrical soft-iron armature suspended movably without any spring, containing at the upper part a cup filled with quicksilver to come in contact with a fixed contact-pin connected to the dynamo and at the under part a contact-pin plunging in a small cup filled with quicksilver, said iron armature being connected through two flexible cables one to the battery the second to the lamp-circuit containing a resistance-coil so that when the dynamo is rotated and its tension becomes sufficient to feed the battery, the cylindrical iron armature is lifted against the action of its own weight by the shunt-winding, the current flowing from the dynamo through the thick-wire winding, the core being maintained in a lifted position and the current branched one part to the battery and the other to the lamp-circuit the resistance being automatically inserted into the lamp-circuit and short-circuited when the dynamo stops.

7. The combination in a car-lighting system of a storage battery, a lamp-circuit, a dynamo driven by the car-axle and provided with reverse compound field-magnet winding, an automatic pole-changer, an automatic switch of described construction with a hand-switch consisting of a contact-lever and a spring-contact movable through an arc of limited length on segments divided in three pairs of contacts connected with the battery, the lamp-circuit and the dynamo so that in one position of the hand-lever the dynamo will be excited and the lamps lighted, on the second position the dynamo will be excited with resistance inserted in the exciting shunt-circuit, the lamps being excluded from circuit, and in the third position the exciting-circuit and the lamp-circuit broken as fully described.

In testimony whereof I have signed this specification in the presence of two subscribing witnesses.

CHARLES VICARINO.

Witnesses:
JULES ARMENGAUD, Jeune,
MARCEL ARMENGAUD.